March 1, 1966   A. B. MENZER   3,237,963
MUD FLAP
Filed Dec. 5, 1963
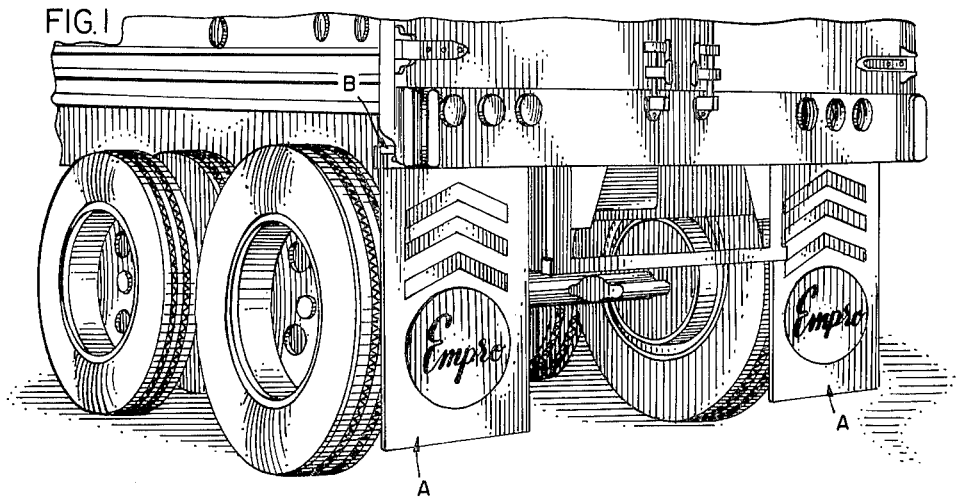
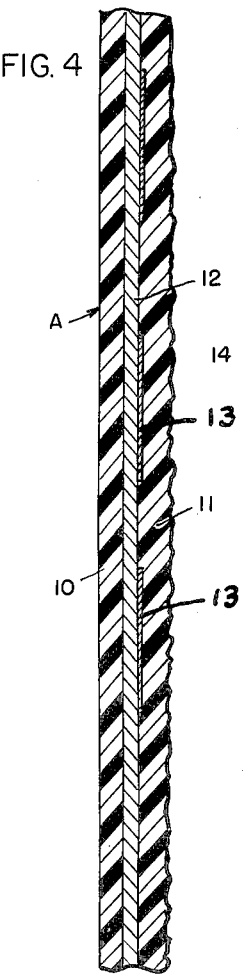
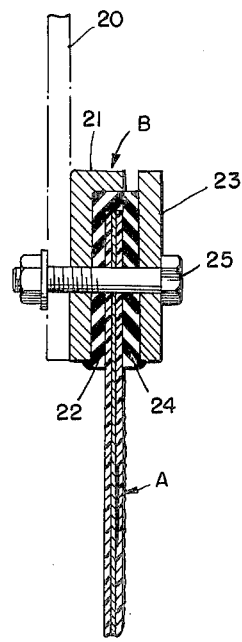
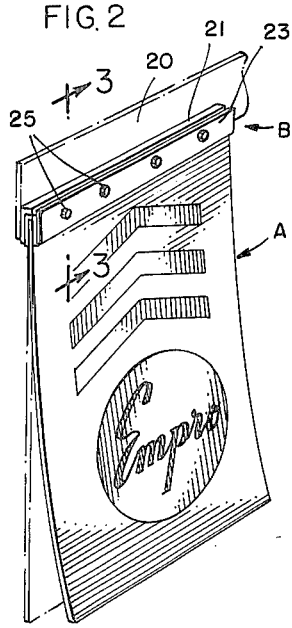
INVENTOR:
ALFRED B. MENZER
BY
Carl C. Batz
ATT'Y

United States Patent Office 3,237,963
Patented Mar. 1, 1966

3,237,963
MUD FLAP
Alfred B. Menzer, Joliet, Ill., assignor to Kemlite Corporation, Joliet, Ill., a corporation of Illinois
Filed Dec. 5, 1963, Ser. No. 328,343
9 Claims. (Cl. 280—154.5)

This invention relates to a mud flap for a truck or other vehicle.

Mud flaps are used to prevent mud, stones, gravel or the like from being thrown to the rear of a vehicle. They are usually mounted on the body or frame of a vehicle and extend downwardly at the rear of the vehicle behind the rear wheels. They are usually made of rubber or similar composition material. In passing along a roadway the rear wheels of the vehicle tend to pick up small stones, mud and moisture from the road and to send this material rearwardly and upwardly, and this is very objectionable to the motorist who may be following. It is the usual function of the mud flaps to intercept this material and keep it from flying into the air and possibly striking the car which is following behind. In some localities it is required by law that trucks or other vehicles with open wheels be equipped with mud flaps.

The mud flaps which heretofore have been available are not altogether satisfactory in that they tend to turn up and fly rearwardly under pressure of the air as the vehicle speeds along the highway. The rubber sheet really does flap in the wind and thus wears itself out, so that it soon breaks up. Also when the flap turns upwardly it fails to serve the function of stopping the mud and stones, etc. which are thrown rearwardly by the vehicle wheel. In attempting to solve this difficulty it has been the practice in some cases to mount metal braces rearwardly of the rubber flap so as to prevent its turning up toward the rear, but this structure is awkward and unsightly and in addition it fails to prevent the turning of the rubber sheet at all points.

An object of the present invention is to provide a mud flap which will not turn backwardly in the breeze as the vehicle moves along a highway and which will effectively intercept stones, mud and moisture from being thrown to the rear.

Another object is to provide such a mud flap which will easily shed the mud and other materials which may be thrown against it and which will be resistant to wear through abrasion with such materials.

Another object is to provide such a mud flap which will be pleasing in appearance and which carries a design or message that can be viewed from the rear of the vehicle. A further object is to provide such a mud flap wherein the design is protected from injury or abrasion by being embedded under the surface of the flap.

Another object is to provide such a mud flap which is of a character that it will yield slightly if it should be struck but which is strong and will not break, and which will bend slightly but which will not turn backwardly so as to expose the wheel of the vehicle toward the rear.

Other objects of the invention will be apparent as the specifications proceeds.

An embodiment of the invention is illustrated in the appended drawings wherein:

FIG. 1 is a perspective view of the rear end of a truck having the improved mud flaps mounted thereon;

FIG. 2 is a perspective view of the mud flap apart from the vehicle upon which it may be mounted;

FIG. 3 is a detail sectional view taken along line 3—3 of FIG. 2 showing a means for mounting the mud flap sheet to a frame member of the vehicle; and FIG. 4 is an expended detail sectional view of the improved panel.

As illustrated, the improved mud flap includes a panel A made of resin reinforced with glass fibers, and the mounting means B for attaching the panel to a frame or body member of the vehicle.

The panel A, as illustrated, is formed of three principal laminations. The front sheet 10 and the rear sheet 11 may be of glass fiber, and the inner sheet 12 may be paper or other matted or woven material, preferably a cellulose fiber material, carrying on its rear surface a design or other printed matter. Each of these sheets are impregnated with a thermosetting resin, preferably a polyester type resin.

In making this panel I may take two sheets of glass fiber matting and place between these sheets the printed cellulose fiber sheet. This assembly is then dipped in a bath of thermosetting resin so that each of the sheets including the center printed sheet is impregnated with resin. The assembly of sheets so impregnated then may be passed between rollers to squeeze out air and provide a uniform thickness after which the structure is cured by mild heat to set the resin. This provides a unitary panel structure which may be mounted as shown in FIG. 1 behind the rear wheel of a vehicle. I prefer that the thickness of the panel be from 0.07 to 0.12 inch, but other thicknesses may be employed.

The resin which is used in this operation may be any resin, but preferably a thermosetting resin, which is capable of being cured or set, including such resins as the polyester resins, acrylic resins, acrylic modified polyester resins, and epoxy resins.

Preferably, the resin has substantially the same light refractive properties as the glass fibers of sheets 10 and 11 and the fibers contained in the center sheet 12, so that when the panel is completed the glass fibers will disappear from view and the design on the center sheet will be distinctly seen.

A particularly good resin for use in this invention is a polyester resin containing a minor amount of styrene.

The front and rear sheets 10 and 11 are preferably of glass fiber mat but may include glass fibers in random or woven arrangement as well. The center sheet 12 is preferably a cellulose material such as paper and may be in matted or woven form. The material of this center sheet should be capable of carrying printed matter on one side. I prefer to use a paper sheet which contains a light color pigment or a pigment which contrasts in color with the color of the printed material which it carries. The paper sheet may desirably contain pigment to the extent that when impregnated with the resin it will pass from 10% to 55%, or more precisely, from 10% to 20%, of the light which is directed against it.

Selection of a paper which has the quality of passing such a desired amount of light may be made by taking a number of samples of paper having varying degrees of pigment density, impregnating the paper with the resin to be used, and then testing by passing a beam of light through each of the sample sheets to a light meter, comparing the amount of light which reaches the meter through each of the samples with the amount of light which reaches the meter when no sample is between the light source and the meter. In making this test the same distances between the light source and the meter must be maintained and the light source must be constant to make the measurements meaningful.

The sheet 12 may be printed with ink 13 to form a design. Referring to FIGS. 2 and 4, we see the chevron design under which is a trademark. The printed design may take any form. For example, the design may contain the name of the manufacturer of the mud flaps or the name of the trucking concern which use them, or may be in the form of advertising matter for any product.

Suitable inks which may be used are vinyl inks, acrylic inks or lacquer inks. The ink may contain pigment of any color or combination of colors and may be of any density, but preferably the ink should be of a dark color or a color which contrasts with the pigment contained in the center sheet 12.

As previously stated, the printed sheet 12 is placed between the glass fiber sheets 10 and 11. This assembly is impregnated with resin and encased in cellulose films and then passed through rollers, after which the assembled sheets are cured and the protective cellulose films removed.

By embossing the cellulose sheets which are used for protective purposes it is possible to provide a crinkled surface, and in one form of the invention I use the embossed film on the rear side of the panel to provide a decorative surface on the mud flap as it may be seen from the rear. (See the crinkled surface 14 of FIG. 4.) I prefer that the front side of the mud flap be smooth and without crinkles as the smooth surface will better shed the mud and other materials which may fly against it.

Instead of using the trilaminated structure of the illustrated embodiment I may use the single sheet form wherein only one sheet of glass fiber impregnated by resin is employed. This form will not give the same advantage in the display of special designs, but it will provide the necessary character to prevent flapping and turning up when the vehicle is in motion and will have the strength and resiliency to give effective service.

The panel A when formed, may be cut to a suitable size for use on the vehicles for which it is intended. For double wheeled trucks of the character illustrated in FIG. 1, this will be of the order of 2 x 3 feet.

The panel A may be mounted on the truck or other vehicle by any suitable means. FIG. 3 illustrates one good way to attach the panel. As here shown the frame member 20 extends downwardly near the rear of the vehicle. Next to the member 20 is placed an inner clamp member 21 which is lined with the gasket 22. On the outside is the outer clamp member 23 which is lined with the gasket 24. The upper portion of the panel extends upwardly between the gaskets 22 and 24, and the bolts 25 pass through aligned holes in the outer clamp member 23, the gasket 24, the panel A, the gasket 22, the inner clamp member 21 and the frame member 20. Tightening of these bolts serves to bind the panel tightly within the clamp members and to bind the clamp members rigidly to the frame member 20.

It is usual that two of the mud flaps be used, one behind each of the rear wheels of the vehicle as shown in FIG. 1, with the panels extending downwardly behind the wheels.

With the improved mud flaps mounted on a truck, for example, and when the truck reaches speeds of 50 or 60 miles per hour, the mud flaps do not fly out toward the rear as would be the case with ordinary flaps, but instead will bend only a small amount. Referring to FIG. 3, the dotted lines illustrate the position of the flap when the truck is stationary, and when the truck assumes speeds of the order of 60 miles per hour the flap will assume a position like that illustrated in solid lines in FIG. 3. While being flexible enough to yield to some degree, the panel is of a character to maintain its general position of effectiveness for intercepting mud and stones etc. and to present the design without distortion.

The panel has a smooth tough surface on its front side so as to resist abrasion and to easily free itself from the dirt and other matter which flies against it, while on its rear surface it remains decorative. The design which is displayed toward the rear, being beneath the surface, remains clear and protected from distortion through abrasion or wear.

While the foregoing detailed description and explanation has been concerned with specific embodiments of the invention, it is understood that the structure and arrangement of the various parts may be changed and varied widely, all within the spirit of the invention and the scope of the following claims.

I claim:

1. A mud flap for a vehicle comprising a glass fiber sheet impregnated with thermosetting resin, said sheet having a smooth surface on its front side which faces the wheel of the vehicle and having a crinkled decorative surface on its rear side which faces following vehicles, and means for attaching said sheet on the vehicle at a point behind the rear wheel of said vehicle.

2. A mud flap for a vehicle comprising a pair of glass fiber sheets, a cellulose fiber sheet between said glass fiber sheets, pigment carried by said cellulose fiber sheets and arranged to form a design, each of said sheets being impregnated with a thermosetting resin which has light refractive properties substantially the same as the fibers in said glass fiber sheets whereby said glass fiber sheet on the rear side of said cellulose fiber sheet is translucent and said design reflects light from the rear of the mud flap to make said design apparent when viewed from the rear of the mud flap, said resin being cured to form said sheets in a unitary structure, and means for attaching said structure on a vehicle at a point behind a rear wheel of said vehicle.

3. A mud flap as set forth in claim 2 wherein said resin is a polyester resin.

4. A mud flap as set forth in claim 2 wherein said unitary structure of sheets has a thickness of 0.07 to 0.12 inch.

5. A mud flap as set forth in claim 2 wherein said cellulose fiber sheet is paper and said resin is a polyester resin.

6. A mud flap as set forth in claim 2 wherein said pigment is imprinted on the rear side of said cellulose fiber sheet and has light reflecting properties differing from those of said cellulose fiber sheet.

7. A mud flap as set forth in claim 6 wherein said cellulose fiber sheet is paper.

8. A mud flap as set forth in claim 6 wherein said cellulose fiber sheet contains pigment of such density as to pass between 10 and 55% of light directed against it.

9. A mud flap as set forth in claim 6 wherein said cellulose fiber sheet contains pigment of a color contrasting with the color of said imprinted pigment.

References Cited by the Examiner

UNITED STATES PATENTS

| 1,904,343 | 4/1933 | Zaiger | 280—154.5 |
| 2,421,634 | 6/1947 | Lyon | 280—154.5 X |
| 2,612,964 | 10/1952 | Hobbs | 296—31 X |
| 2,619,363 | 11/1952 | Wenham | 280—154.5 |
| 2,699,955 | 1/1955 | Eaves | 280—154.5 |
| 2,940,773 | 6/1960 | Eaves | 280—154.5 |
| 2,959,511 | 11/1960 | Finger | 264—257 X |
| 3,075,429 | 1/1963 | Deddo. | |
| 3,116,072 | 12/1963 | Robb | 280—154.5 |

FOREIGN PATENTS 1,060,275  6/1959  Germany.

BENJAMIN HERSH, *Primary Examiner.*

LEO FRIAGLIA, *Examiner.*

A. HARRY LEVY, W. A. MARCONTELL,
*Assistant Examiners.*